(12) United States Patent
Shirotori et al.

(10) Patent No.: US 7,708,543 B2
(45) Date of Patent: May 4, 2010

(54) STAMPER FOR MAGNETIC RECORDING MEDIA, METHOD OF MANUFACTURING MAGNETIC RECORDING MEDIA USING THE SAME, AND METHOD OF MANUFACTURING STAMPER FOR MAGNETIC RECORDING MEDIA

(75) Inventors: Satoshi Shirotori, Fuchu (JP); Masatoshi Sakurai, Tokyo (JP); Yoshiyuki Kamata, Tokyo (JP); Akira Kikitsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 876 days.

(21) Appl. No.: 11/527,467

(22) Filed: Sep. 27, 2006

(65) Prior Publication Data

US 2007/0070548 A1 Mar. 29, 2007

(30) Foreign Application Priority Data

Sep. 27, 2005 (JP) ............................. 2005-279402

(51) Int. Cl.
*B29C 59/00* (2006.01)
*B29D 17/00* (2006.01)
(52) U.S. Cl. ...................... 425/385; 264/293; 264/1.33; 425/810
(58) Field of Classification Search ................. 425/385, 425/810; 264/293, 1.33; 101/28
See application file for complete search history.

(56) References Cited

U.S. PATENT DOCUMENTS

2004/0228035 A1 11/2004 Yoshimura

FOREIGN PATENT DOCUMENTS

| JP | 10-283632 | 10/1998 |
|---|---|---|
| JP | 2004-066447 | 3/2004 |
| JP | 2005-038477 | 2/2005 |
| JP | 2005-108361 | 4/2005 |
| JP | 2005-353164 | 12/2005 |

OTHER PUBLICATIONS

Translation of JP 2006-120299 (Effect of the invention); Nakada, et al., published May 11, 2006.*
C Gourgon et al.; "Influence of pattern density in nanoimprint lithography"; J. Vac. Sci. Technol, B 21(1); Jan./Feb. 2003.
Japanese Office Action dated Feb. 2, 2010.

* cited by examiner

*Primary Examiner*—Maria Veronica D Ewald
(74) *Attorney, Agent, or Firm*—Pillsbury Winthrop Shaw Pittman, LLP

(57) ABSTRACT

According to one embodiment, a stamper for a magnetic recording media has patterns of protrusions and recesses to manufacture a discrete track recording type magnetic recording media having servo areas including an address portion, a preamble portion and a burst portion, and data areas including a recording track portion, the patterns of protrusions and recesses being formed at a pitch of 400 nm or less, in which a magnitude relation of depths of recesses corresponding to the address portion, the preamble portion, the burst portion and the recording track portion is inverted to a magnitude relation of area ratios of the protrusions to the recesses in the address portion, the preamble portion, the burst portion and the recording track portion.

3 Claims, 7 Drawing Sheets

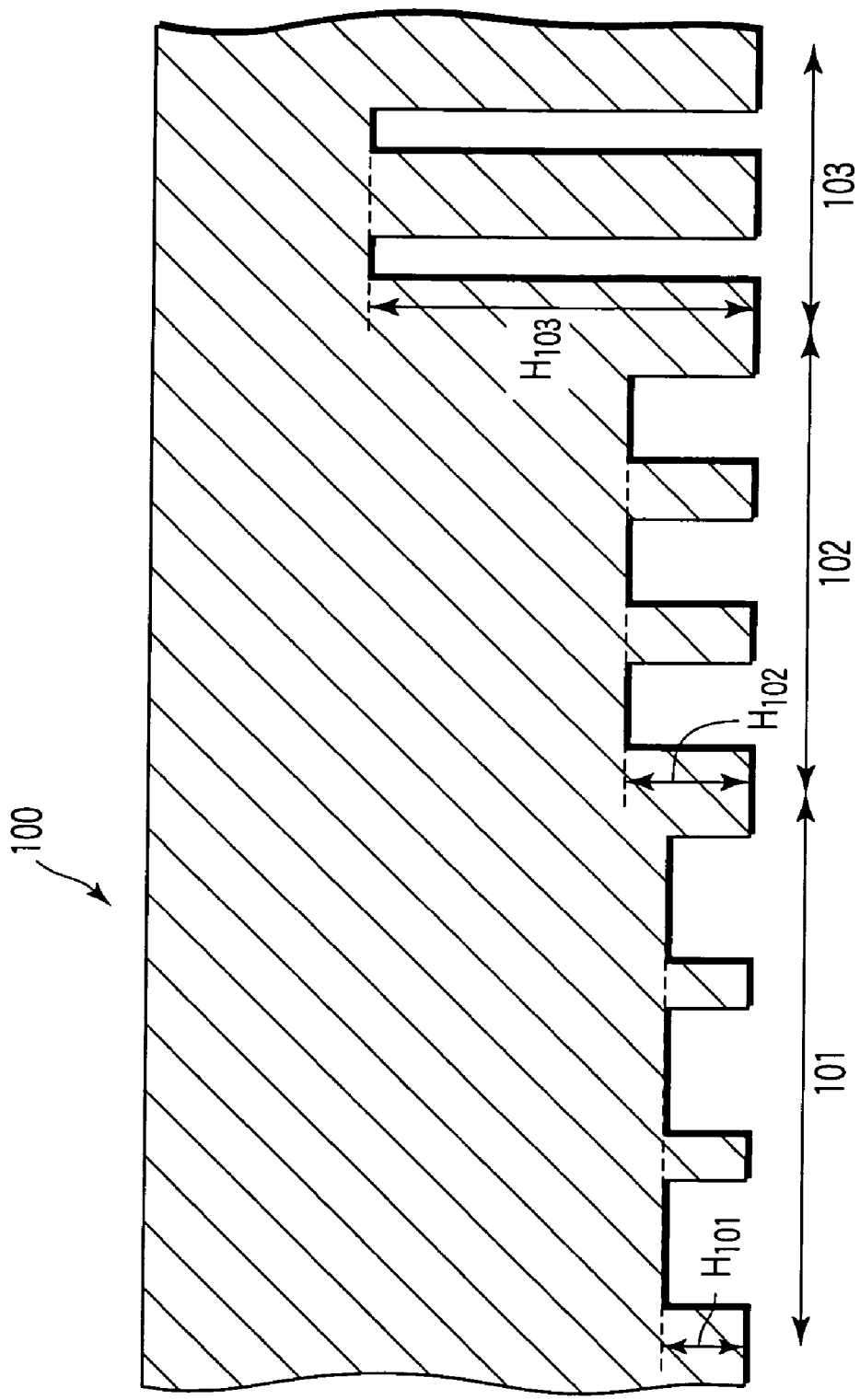
F I G. 1

STAMPER FOR MAGNETIC RECORDING MEDIA, METHOD OF MANUFACTURING MAGNETIC RECORDING MEDIA USING THE SAME, AND METHOD OF MANUFACTURING STAMPER FOR MAGNETIC RECORDING MEDIA

CROSS-REFERENCE TO RELATED APPLICATIONS

This application is based upon and claims the benefit of priority from Japanese Patent Application No. 2005-279402, filed Sep. 27, 2005, the entire contents of which are incorporated herein by reference.

BACKGROUND

1. Field

One embodiment of the present invention relates to a stamper for a discrete track recording (DTR) type magnetic recording media, a method of manufacturing a DTR type magnetic recording media using the same, and a method of manufacturing a stamper for a DTR type magnetic recording media.

2. Description of the Related Art

As a media for realizing high capacity recording, many developments of discrete track recording type magnetic recording media have done. Patterns of the DTR type magnetic recording media are largely divided into patterns of data area and patterns of servo areas.

The data area includes a recording track portion. The recording track portion is to form a user recording area for recording and reproducing user data by a head, and has patterns in which toric magnetic tracks are arranged at a specified cycle (track pitch Tp) via nonmagnetic guard bands. The magnetic track is formed of a ferromagnetic material, for example, CoCrPt. The nonmagnetic guard band is an unrecordable area, and separates a data recording layer radially. Further, the toric magnetic track is divided into sectors in the circumferential direction by the servo areas, and formed so that a radial width Tw of the magnetic track is larger than that of the nonmagnetic guard band.

The servo areas are prebit areas in which patterns of magnetic material/nonmagnetic material corresponding to information necessary for positioning the head are formed. The shape of the servo areas is a circular arc to be the orbital of access of the head to a magnetic recording apparatus, and is formed such that the circumferential length thereof becomes long in proportion to the radial position.

The servo areas are generally comprising a preamble portion, an address portion, and a deviation detection burst portion (hereinafter, burst portion), and the servo areas are formed into patterns of magnetic material/nonmagnetic material in the same manner as the data area.

The occupancy rate of magnetic material factor varies in the data area and the servo areas.

An ultrafine structure of such a DTR media with the track pitch of 400 nm or less cannot be manufactured by a method using photolithography. Meanwhile, a method of manufacturing patterns on an entire disk surface by electron beam lithography or the like leads to low mass productivity. The DTR media having such an ultrafine and large-area structure is manufactured by, for example, an imprint method. The imprint method, to be described in more details later, is a method in which a resist film is applied onto a recording layer formed on a substrate, a stamper having patterns with protrusions and recesses inverted with respect to patterns to be formed is pressed onto the resist film to transfer the patterns to the resist, and a magnetic film is processed according to the patterns.

A UV type imprint method and a hot embossing type imprint method have been known as the imprint method. The UV type imprint method is suitable for forming ultrafine and highly precise patterns. On the other hand, the hot embossing type imprint method is suitable for forming complicated shapes and high-aspect structures. However, the two methods have had the problem of their low throughput.

Examples of the imprint method for improving throughput include a high pressure type imprint method in which high pressure is applied to between a substrate and a stamper at room temperature to offset film thickness unevenness.

A stamper for a magnetic recording media to be used in the general imprint method can be manufactured by use of the electron beam lithography, X-ray lithography and the like, and for example, a master disk can be also reproduced by use of the imprint method. Jpn. Pat. Appln. KOKAI Publication No. 2005-38477 discloses a method of manufacturing a stamper by use of the imprint method.

A stamper for a magnetic recording media has recesses corresponding to magnetic portions after completion of the media. By using stampers of different areas of the bases of the recesses corresponding to respective magnetic portions after completion of the media, the above-described DTR type magnetic recording media having patterns with different occupancy rate of magnetic material can be manufactured.

Herein, in the case where a normal stamper in which the depths of recesses are equal is used in the manufacture of magnetic recording media, the spatial volumes of recesses vary with the respective areas of the base. The resist volume necessary for filling the space varies between areas of small spatial volume and areas of large spatial volume. The difference in necessary resist volume is compensated in such a manner that the resist existing around the areas of large spatial volume moves to the spaces of the recesses in the area. As a result, there occurs unevenness in the movement amounts of resists depending on pattern areas, and the film thickness of resist residues in patterns transferred by recesses of large area of the base becomes thinner than that of resist residues in patterns transferred by recesses of small area of the base.

When unevenness occurs in the film thickness of resist residues, a problem arises in removing residues by reactive ion etching (RIE) of oxygen or the like. That is the problem that resist residues of thin film thickness are removed before resist residues of thick film thickness are removed, and accordingly, side etching is performed excessively on the portions where the resist residues have been removed first.

Patterns of protrusions and recesses transferred by use of a stamper broaden due to RIE for use in removing resist residues, Ar iron milling for use in processing a magnetic film, and the like. In the broadening, there occurs unevenness according to respective pattern areas if the above-described excessive side etching occurs. For this reason, there occurs a difference in broadening of patterns depending on pattern areas between a stamper pattern as a design value and the pattern after completion of media. As a result, it becomes difficult to design a stamper for manufacturing DTR type magnetic recording media of desired dimensions. The problem arising from the difference in resist movement amount does not happen in the UV type or hot embossing type imprint method, and it is the problem peculiar to the high pressure type imprint method.

Jpn. Pat. Appln. KOKAI Publication No. 2005-38477 discloses a stamper for transferring patterns of protrusions and recesses to a data recording area, but there is description that the above "data recording area" does not include an area where servo patterns for tracking are recorded (servo area), a retreat area of a magnetic head, or the like. In other words, the stamper of the Jpn. Pat. Appln. KOKAI Publication No. 2005-38477 does not take into consideration transferring patterns to areas of different occupancy rate of magnetic material.

J. Vac. Sci. Tecnol. B21 (1), January/February 2003 describes that, when aspect ratios are varied between patterns in nano imprint, the amount of moving resists changes together with aspect ratios, and the depth at which resists are filled in recesses of the stamper also changes. The literature describes that adjustment is made by changing resist viscosity and imprint time. In the literature, a stamper of constant depth of recesses is employed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a schematic cross section of an example of a stamper for a magnetic recording media according to the present invention;

DETAILED DESCRIPTION

Figure 2:
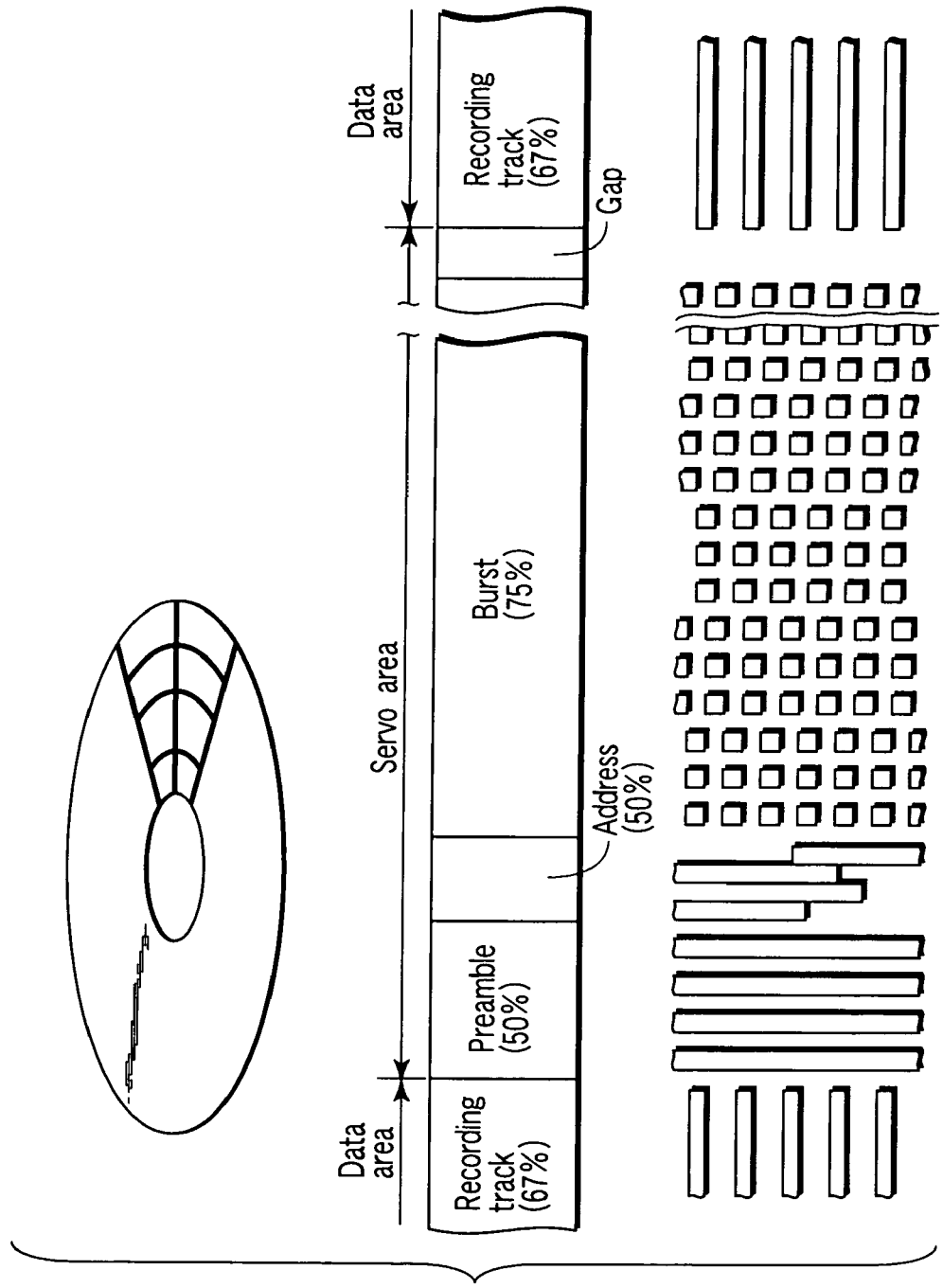
FIG. 2 is a view showing servo areas pattern of a magnetic recording media including ABCD burst, to be manufactured by the stamper for a magnetic recording media according to the invention.

Various embodiments according to the invention will be described hereinafter with reference to the accompanying drawings. In general, according to one embodiment of the present invention, there is provided a stamper for a magnetic recording media comprising patterns of protrusions and recesses to manufacture a discrete track recording type magnetic recording media comprising servo areas including an address portion, a preamble portion and a burst portion, and data areas including a recording track portion, the patterns of protrusions and recesses being formed at a pitch of 400 nm or less, wherein a magnitude relation of depths of recesses corresponding to the address portion, the preamble portion, the burst portion and the recording track portion is inverted to a magnitude relation of area ratios of the recesses to the protrusions in the address portion, the preamble portion, the burst portion and the recording track portion.

The present inventors took into consideration the fact that the above problem comes from the difference of spatial areas of respective recesses of the stamper. Then, the inventors found that the above problem can be solved by manufacturing a DTR type magnetic recording media by use of a stamper where the depths of recesses of patterns are changed according to the areas of the bases of recesses in respective pattern areas.

An example of a stamper according to the present invention will be explained with reference to FIG. 1.

A stamper 100 has patterns of protrusions and recesses formed at a pitch of 400 nm or less, and includes a structure in which the area ratio of protrusions to recesses is difference in adjacent areas, for example, pattern areas 101, 102 and 103 shown in FIG. 1. The total values of areas of the bases in recesses in the respective pattern areas have the relation of 101>102>103. In the present invention, the depths $H_{101}$, $H_{102}$, $H_{103}$ of recesses in respective patterns in the pattern areas satisfy the relation of $H_{101}<H_{102}<H_{103}$. Herein, it is preferable that the difference between $H_{101}$ and $H_{102}$ and between $H_{102}$ and $H_{103}$ is 5 to 15 nm. The reason for this will be described later. Note that the stamper in FIG. 1 is one example of the stamper according to the invention, and the kinds of areas where the area ratio of protrusions to recesses is different are not limited to three kinds. Further, the order in which pattern areas exist is not limited to 101, 102 and 103.

When a DTR type magnetic recording media is manufactured by using the stamper according to the invention shown in FIG. 1, it is possible to suppress the variability of resist movement amounts in the pattern areas 101, 102 and 103, and to uniform resist residues left in recesses of the respective pattern areas transferred. As a result, it is possible to uniform the broadenings of patterns after completion of a media from the stamper pattern as the design value irrespective of pattern areas.

Next, with reference to the drawings, a DTR media to be manufactured by use of the stamper according to the invention will be explained.

FIG. 2 is a view for explaining details of servo areas pattern in a DTR media having a burst servo. The servo area pattern is a surface type pattern of the portion that the head passes from the left to the right when the media is assembled in a drive.

Both the sides in FIG. 2 are data areas. A ratio of the width of a magnetic track to the width of a nonmagnetic guard band in a recording track portion configuring a data area is 2:1, namely, the occupancy rate of magnetic material in the data area is approximately 67%.

The servo areas are, as described previously, roughly divided into a preamble portion, an address portion, and a burst portion. Hereinafter, the roles of these areas will be explained in details.

The preamble portion is provided for performing a phase-locked loop (PLL) process for synchronizing a servo signal reproduction clock and an automatic gain control (AGC) process for keeping the signal reproduction amplitude appropriately with respect to a time lag arising from rotation decentering and the like of a media. The preamble portion is formed of patterns in which magnetic materials and nonmagnetic materials are repeatedly arranged alternately in the circumferential direction, and the magnetic materials and the nonmagnetic materials expand radially in the radial direction so as to form circular arcs. A ratio of the magnetic material to the nonmagnetic material in the preamble portion is approximately 1:1. Namely, the occupancy rate of magnetic material in the preamble portion is approximately 50%. Meanwhile, the repetition cycle in the circumferential direction varies in proportion to the radial distance. However, it is a visible wavelength or less even at the outermost circumference, and it is difficult to identify the servo areas by optical diffraction, like the data area.

The address portion has a servo signal recognition code called servo mark, sector information, cylinder information and the like, which are formed in Manchester code in the same pitch as the circumferential pitch of the preamble portion. In particular, the cylinder information is formed as patterns whose information changes per servo track. For this reason, code conversion called Gray code where the change from adjacent tracks becomes minimum is carried out such that the influence of address reading mistakes at seek operation becomes small, and then, the information is recorded in Manchester code. The occupancy rate of magnetic material of this area is approximately 50%.

The burst portion is an off-track detection area for detecting an off-track amount from an on-track state of a cylinder address. Patterns of four marks called A, B, C and D bursts, among which there are pattern phases lag in the radial direction, are formed. In the respective bursts, plural marks are arranged in the circumferential direction at the same pitch as that in the preamble portion. The cycle of each burst in the radial direction is in proportion to the cycle of the address pattern, i.e., the servo track cycle. For example, a pattern is formed in which each burst mark is formed for 10 cycles in the circumferential direction and is repeated at twice the cycle of the servo track cycle in the radial direction. Since the burst marks are formed of a nonmagnetic material, the occupancy rate of magnetic material in the ABCD burst is approximately 75%.

Further, the mark shape is intended to be formed into basically a square, and strictly a parallelogram in consideration of the skew angle at the time of head access. However, the shape becomes a bit round shape under the stamper processing precision and processing performances of transfer formation and the like. With regard to the position detection principle from the burst portion, although details are omitted, an average amplitude value of respective ABCD burst portion reproduction signals is calculated, and thereby the off-track amount is calculated.

Figure 3:
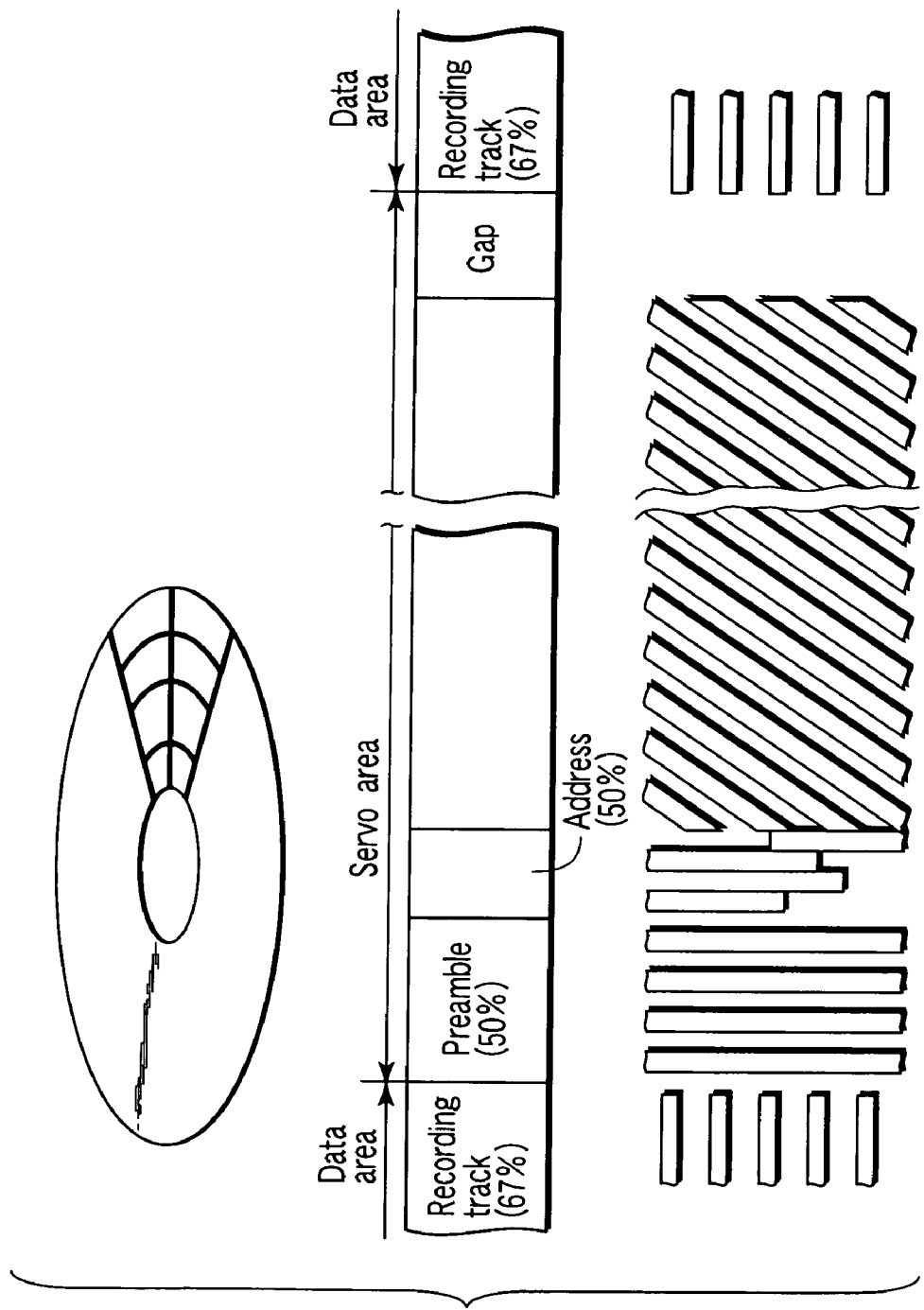
FIG. 3 is a view showing servo areas pattern of a magnetic recording media including phase difference burst, to be manufactured by the stamper for a magnetic recording media according to the invention.

As shown in FIG. 3, patterns may be arranged for performing phase difference servo control, and used as off-track amount detection means without using the ABCD burst. The occupancy rate of magnetic material in the phase difference servo pattern is approximately 50%.

In the case where a DTR type magnetic recording media is manufactured by the imprint method, a stamper is used in which magnetic material patterns of a magnetic recording media to be manufactured are formed as recesses. That is, the area ratio of the protrusions to the recesses in the stamper is inverted to the occupancy rate of magnetic material at respective portions of the magnetic recording media. Accordingly, the area ratios of the protrusions to the recesses in the preamble portion, the address portion and the phase difference burst portion are each 50%, the area ratios of the protrusions to the recesses in the ABCD burst portion is 25%, and the area ratios of the protrusions to the recesses in the recording track portion is 33%.

Figure 4:
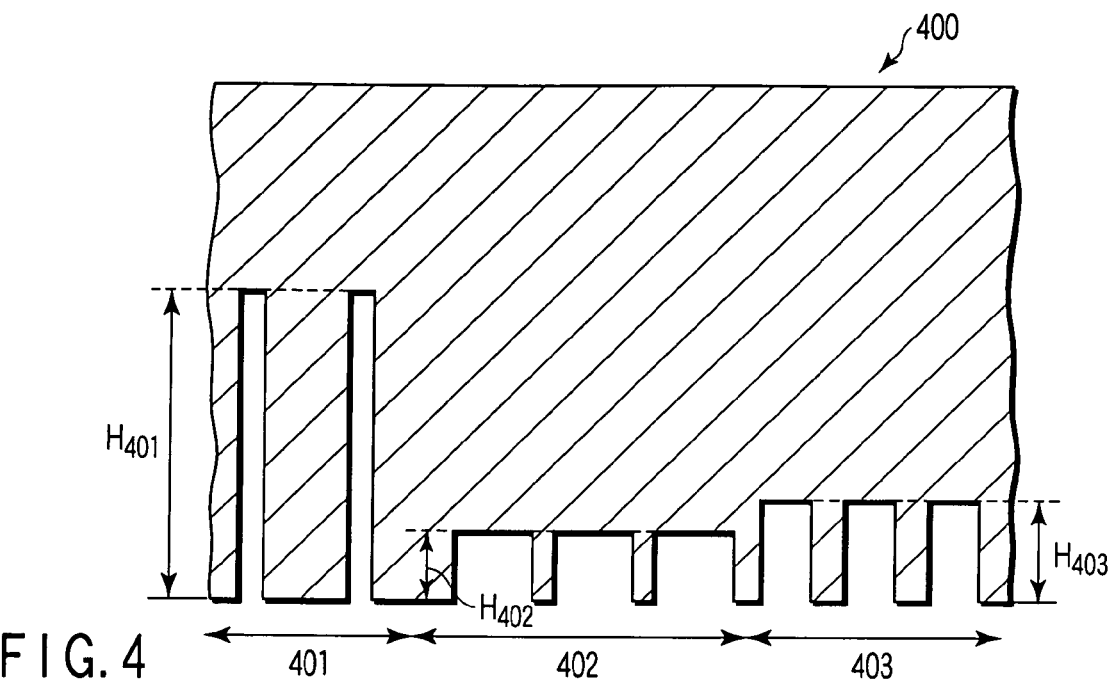
FIG. 4 is a schematic cross section of an example of a stamper for a magnetic recording media including ABCD burst according to the invention.

FIG. 4 is a schematic cross section of a stamper 400 for forming patterns of protrusions and recesses of a DTR type magnetic recording media including an ABCD burst area. Herein, patterns transferred by the imprint method are isotropically etched around 10 nm also in the horizontal direction at the time of etching for processing the media. For this reason, the average area ratio of the actual pattern after completion of the media becomes a larger value than the above-described average area ratio. The average area ratio of the stamper changes depending on the track pitch, and is not limited to the above area ratio. However, the magnitude relation of the average area ratios of the protrusions to the recesses in the respective patterns of the stamper does not change. More specifically, the relation of the preamble portion, the address portion pattern area 401> the recording track portion pattern area 403> the burst portion pattern area 402 is satisfied. Accordingly, note that, on the contrary to the magnitude relation of the average area ratios of the respective pattern areas, the magnitude relation of the total values of the areas of the bases of the recesses of these areas satisfies the relation of the preamble portion, the address portion pattern area 401< the recording track portion pattern area 403< the burst portion pattern area 402. On the other hand, in the stamper shown in FIG. 4, the depths of the recesses in the patterns in respective pattern areas, on the contrary to the magnitude relation of the total values of areas of the bases of recesses of the respective pattern areas, satisfies the relation of $H_{401}>H_{403}>H_{402}$.

Herein, it is preferable that the difference of depths of recesses of patterns between the preamble portion, the address portion pattern area 401 and the recording track portion pattern area 403, and the difference of depths of recesses of patterns between the recording track portion pattern area 403 and the burst portion pattern area 402 are in the ranged from 5 to 15 nm. If it is below 5 nm, there occurs variability due to pattern areas in the broadening of patterns after completion of a media from the stamper pattern as the design value, in the same manner as the case where a stamper with no difference in depth is employed. On the other hand, if it exceeds 15 nm, the patterns of the preamble portion, the address portion after completion of a media broaden on the contrary to the case when a stamper with no different in depth is employed. As a result, in this case also, there occurs variability in the broadening of patterns due to pattern areas.

In the stamper in FIG. 4, there is a inverse correlation between the depths of recesses of respective patterns and the total value of areas of the bases of recesses in the pattern areas including thereof. If the difference of depths of recesses of patterns between different pattern areas is in the range from 5 to 15 nm, the difference in spatial volume between the respective pattern areas can be reduced, so that the variability of the resist movement amounts at the time of imprint due to pattern areas can be suppressed. As a consequence, it is possible to uniform resist residues irrespective of pattern areas, and to uniform the broadenings of patterns after completion of a media from the stamper pattern as the design value irrespective of pattern areas.

Figure 5:
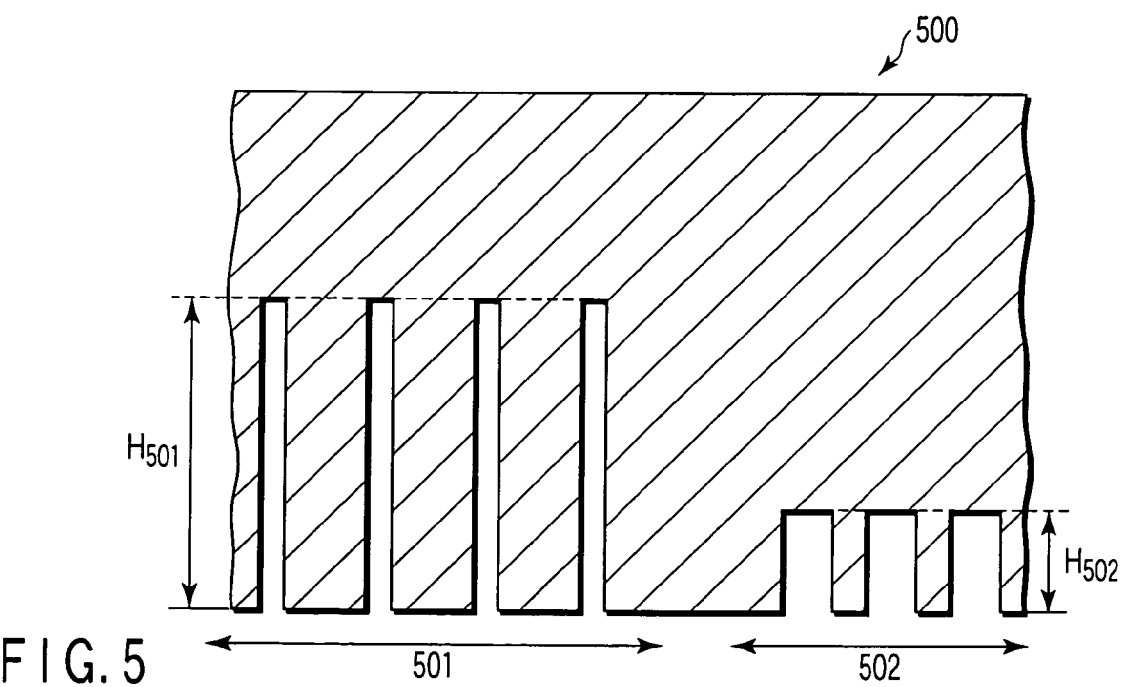
FIG. 5 is a schematic cross section of an example of a stamper for a magnetic recording media including phase difference burst according to the invention.

FIG. 5 is a schematic cross section of a stamper 500 for forming patterns of protrusions and recesses of a DTR type magnetic recording media including a phase difference burst area. An average area ratio of protrusions to recesses in respective pattern areas satisfies a relation of preamble portion, address portion, burst portion pattern area 501> recording track portion pattern area 502. Accordingly, the magnitude relation of the total values of areas of the bases of recesses in the respective pattern areas becomes the preamble portion, the address portion, the burst portion pattern area 501< the recording track portion pattern area 502. Further, in the stamper shown in FIG. 5, the depths of recesses of patterns in the respective pattern areas satisfies the relation $H_{501}>H_{502}$, on the contrary to the magnitude relation of the total values of areas of the bases of recesses of the respective pattern areas.

Herein, it is preferable that the difference of depths of recesses of patterns between the preamble portion, the address portion, the burst portion pattern area 501 and the recording track portion pattern area 502 is in the range from 5 to 15 nm. If it is below 5 nm, there occurs variability due to pattern areas in the broadening of patterns after completion of a media from the stamper pattern as the design value, in the same manner as the case where a stamper with no difference in depth is employed. On the other hand, if it exceeds 15 nm, the patterns of the preamble portion, the address portion, and the burst portion after completion of a media are broadened, on the contrary to the case where a stamper with no different in depth is employed. As a result, there occurs variability in pattern broadenings due to pattern areas.

Also in the stamper in FIG. 5, there is a inverse correlation between the depths of recesses of respective patterns and the total value of areas of the bases of recesses in the pattern areas including thereof. If the difference of depths of recesses of patterns between different pattern areas is in the range from 5 to 15 nm, the difference in spatial volume between the respective pattern areas can be reduced, so that the variability of the resist movement amounts at the time of imprint due to pattern areas can be suppressed. As a consequence, it is possible to uniform resist residues irrespective of pattern areas, and to uniform the broadenings of patterns after completion of a media from the stamper pattern as the design value irrespective of pattern areas.

Hereinafter, an example of a method of manufacturing a DTR type magnetic recording media using a stamper according to the invention will be explained with reference to FIGS. 6A to 6I.

Herein, as a substrate 1, a crystallized glass substrate with a diameter of 2.5 inches is used. Lithium system crystallized glass may be used as the crystallized glass.

Figure 6A:
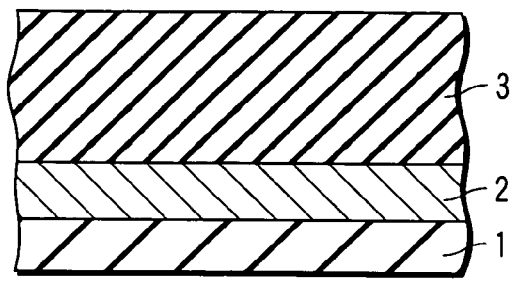
FIGS. 6A, 6B, 6C, 6D, 6E, 6F, 6G, 6H and 6I are views showing an example of a method of manufacturing a magnetic recording media according to the present invention, the method using the stamper for a magnetic recording media according to the invention.

First, the substrate 1 is cleaned and introduced into a spatter apparatus, and a magnetic film 2 comprising a soft underlayer and a recording layer of CoCrPt system alloy is formed on the substrate 1. Then, as shown in FIG. 6A, a resist film 3, for example, S1801 manufactured by Rohm & Haas Co. is spin-coated onto the magnetic film 2 at a rotation speed of 4000 rpm. A raw material for the resist 3 may be selected from a wide range. Spin-on-glass (SOG) or the like may be also used.

Figure 6B:
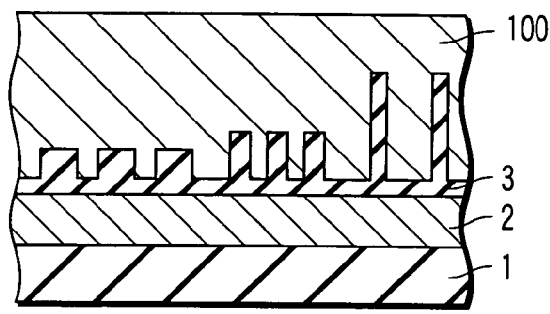

Then, as shown in FIG. 6B, patterns of protrusions and recesses are transferred to the resist film 3 by use of the stamper 100 for a magnetic recording media according to the invention.

Before the imprint process is carried out, the stamper 100 for a magnetic recording media according to the invention is process as described below. First, in order to increase the adhesion between a perfluoroalkil derivative and the stamper 100 made of nickel, the stamper 100 is oxidized by an asher at 40° C. or higher for five minutes. By using, as the perfluoroalkil derivative, a louver containing a solution obtained by diluting perfluoropolyether (HOOC—$CF_2$—O—($CF_2$—$CF_2$—O)$_m$—($CF_2$—O)$_n$—($CF_2$—COOH) by GALDEN-HT70 (manufactured by Solvay Solexis), the stamper 100 is covered with the perfluoroalkil derivative. Thereafter, the stamper is annealed at 150° C. for 10 minutes in a nitrogen atmosphere. By covering the stamper 100 with the perfluoroalkil derivative as a fluoro system remover in this manner, release property from mold at the time of imprint is increased.

After the above process, the stamper 100 is pressed for one minute at 2000 bar, whereby the patterns are transferred to the resist 3. After the stamper 100 is removed as shown in FIG. 6C, the resist film 3 to which the patterns have been transferred is UV radiated for five minutes, and then heated at 160° C. for 30 minutes.

Figure 6C:
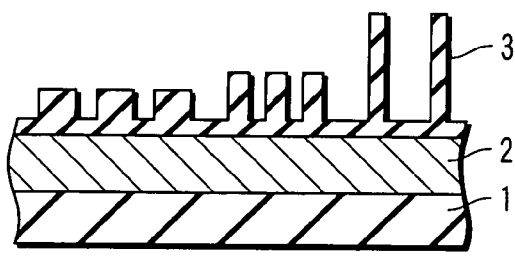

When the stamper 100 is removed as shown in FIG. 6C, it is possible to uniform resist residues left in recesses in respective pattern areas in the case where the stamper 100 of the invention is used in the imprint method.

Figure 6D:
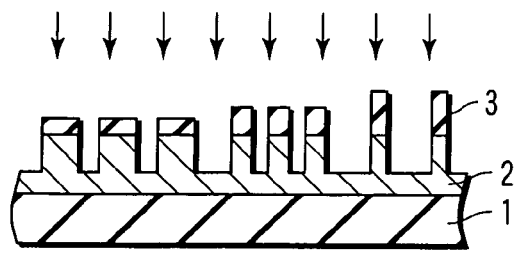

Next, as shown in FIG. 6D, resist residues left in the recesses are removed. For removing the residues, RIE using oxygen gas is employed. In order to remove residues without changing protrusion and recess shapes transferred to the resist film 3, low pressure, high density plasma source RIE is preferable, and it is preferable to use an inductively couple plasma (ICP) or electron cyclotron resonance (ECR) etching apparatus. For example, oxygen RIE is used in an ICP etching apparatus under the condition of etching pressure around 2 mTorr, whereby residues are removed. By using the stamper 100 of the invention in the imprint method, the variability of resist residues left in recesses due to pattern areas is suppressed. Consequently, in removing residues, it is possible to prevent excessive side etching, and to uniform the broadenings of patterns after completion of a media from the stamper pattern as the designed value irrespective of pattern areas.

Figure 6E:
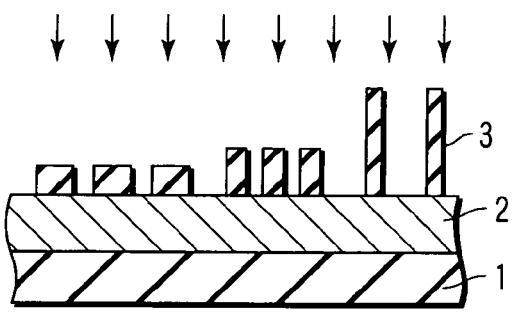

Subsequently, as shown in FIG. 6E, the magnetic film 2 is etched by Ar ion milling. To eliminate damage on the ferromagnetic recording layer, etching is carried out while varying an ion incident angle from 30 degrees to 70 degrees so as to prevent a redeposit phenomenon. Along with the prevention of the redeposit phenomenon, a taper angle around 40 degrees to 75 degrees is made at a pattern side wall.

Figure 6F:
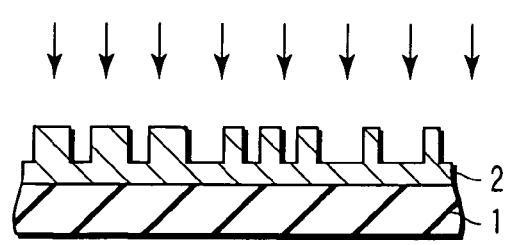

After etching the magnetic material, oxygen RIE is used for removing the etching mask as shown in FIG. 6F. In order to remove the mask effectively, it is preferable to use high pressure, high power oxygen plasma. For example, oxygen RIE is performed under conditions of 400 W, around 1 Torr to remove the etching mask.

After removal of the resist, recesses are filled with a nonmagnetic material 4. In embedding, a nonmagnetic material is formed into a film by a spattering method. The nonmagnetic material can be selected widely from oxides such as $SiO_2$, $TiO_x$ and $Al_2O_3$, nitrides such as $Si_3N_4$, AlN and TiN, carbides such as TiC, borons such as BN, and simple substances such as C and Si. Herein, RF 200 W was applied to C target, and bias sputtering was carried out at 9 Pa. When the surface of a discrete track media having a nonmagnetic film of around 100 nm formed thereon was observed by an atomic force microscope (AFM), preferable filling at surface roughness Ra=0.6 nm, that is, in which there are little protrusions and recesses, was made.

Figure 6G:
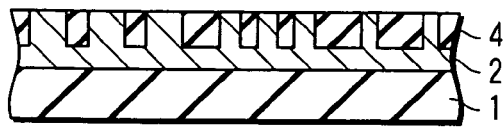

Thereafter, etch-back is carried out until the tops of the magnetic film 2 is exposed. The roughness (Ra) of the media surface after the etch-back was 0.6 nm. It is preferable that the etch-back process is carried out by use of Ar ion milling. Further, it may be carried out by use of oxygen RIE. Herein, under the conditions of the acceleration voltage of 400V and the ion incidence angle of 30 degrees, ion milling was carried out for 20 minutes, and etch-back was carried out until the tops of protrusions of the ferromagnetic material were exposed completely (FIG. 6G).

Figure 6I:
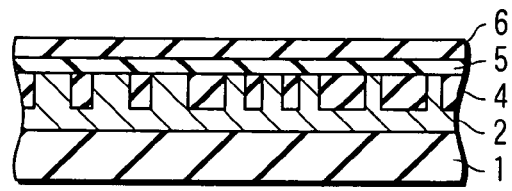
Figure 6H:
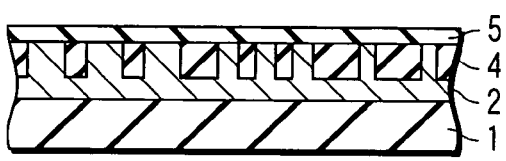

After processing the magnetic material, a carbon protective film 5 is formed as a protective film, as shown in FIG. 6H. As the carbon protective film 5, DLC with a large rate of $sp^3$-bonded carbon is preferable. The DLC can be formed into a film by sputtering using graphite target, and chemical vapor deposition (CVD). CVD is preferable for forming a film of DLC with richer $sp^3$-bonded carbon. It is better that the film thickness of the carbon protective film 5 is as thinner as possible. However, if it is too thin, the coverage of a media becomes deteriorated, and therefore, the film thickness is preferably 3 to 4 nm.

As shown in FIG. 6I, a liquid lubrication layer 6 is applied onto the manufactured discrete track media by a dip method. The media is dipped into a container filled with a lubricating agent (for example, perfluoropolyether), and the layer thickness of the lubricating agent is controlled by controlling the pull-out speed. As the pull-out speed is slower, the lubricating agent film thickness becomes thinner. It is preferable that the lubricating agent film thickness is thinner. However, if it is too thin, the free layer becomes small, and self-repairing cannot be made, which is not preferable. It is preferable that the film thickness is around 1 nm.

By use of the method shown in FIG. 6, a DTR type magnetic recording media including ABCD burst area was actually manufactured. Herein, in the process in FIG. 6B, a stamper in which the difference of depths of recesses of patterns between different pattern areas was 0 nm (a normal stamper with no difference in depth), and a stamper according to the invention in which the depth difference was 10 nm were used.

Table 1 shows the differences between the widths of design values of recesses of pattern areas of the stamper and the widths of protrusions of the pattern-formed magnetic recording media by means of AFM measurement. It is known that patterns after process are broadened around 10 to 17 nm from patterns before process due to oxygen RIE at removal of resist residues carried out at processing of the magnetic recording media, and Ar ion milling at etching the magnetic film.

TABLE 1

|  | preamble | adress | burst | track |
| --- | --- | --- | --- | --- |
| stamper with recesses, in which there are no different in depth | +10 nm | +11 nm | +17 nm | +14 nm |
| stamper with recesses, in which the diffrence of depths of recesses of patterns between different areas is 10 nm | +11 nm | +10 nm | +11 nm | +10 nm |

Table 1 shows that when the normal stamper of identical depths of recesses is used, the difference of broadenings of patterns among the preamble portion, the address portion and the burst portion after completion of a media is 7 nm, and the difference of broadenings of patterns is large. The reason is considered as follows. That is, when the normal stamper of identical depths of recesses is used, the resist residues of the burst portion whose resist residual film thickness is thin are removed before residues of the preamble portion and the address portion whose resist residual film thickness is thick are removed by RIE. Accordingly, side etching is carried out excessively to the burst portion from which resist residues have been removed first.

On the other hand, it is found that, when the stamper in which the depths of recesses of patterns are different with pattern areas is used, the difference among pattern areas, of broadenings of patterns after completion of a media from the stamper pattern is within 1 nm. This is because, by the use of the stamper of the invention in which the depths of recesses are different according to pattern areas, it is possible to uniform the thicknesses of resist residues left in recesses irrespective of pattern areas, and to prevent excessive side etching.

Next, by use of a stamper in which the differences of depths of recesses of patterns among the pattern areas are 3 nm, 5 m, 15 nm and 20 nm, a DTR magnetic recording media was manufactured, and broadenings of patterns after completion of a media from the stamper patterns as the design values were measured, respectively. The result is shown in FIG. 7, together with the results obtained by use of the stamper without difference of depths of recesses and the stamper whose depth difference is 10 nm.

Figure 7:
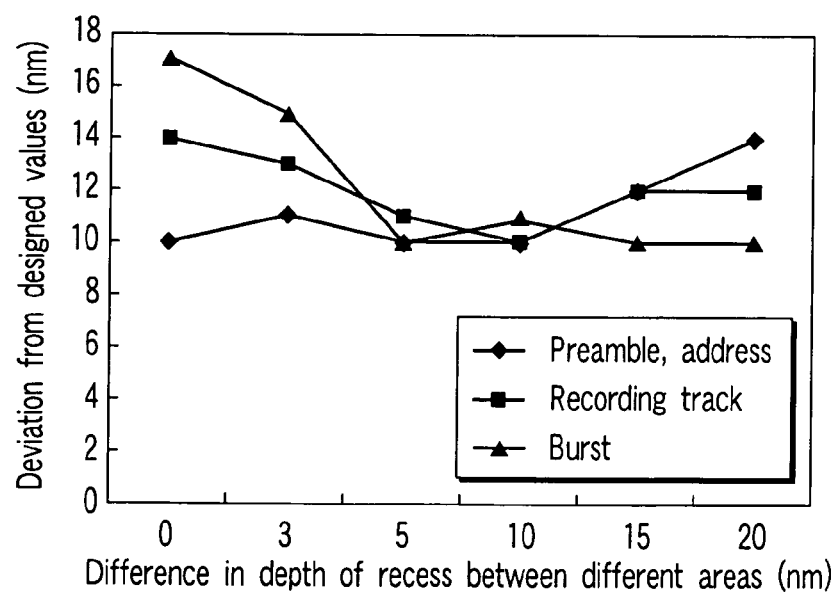
FIG. 7 is a graph showing broadenings of patterns in respective pattern areas after completion of magnetic recording media manufactured by use of various stampers, from their respective stamper design values.

As shown in FIG. 7, when the difference of depths of recesses is 3 nm, the difference of broadenings of patterns spreads approximately 4 nm between the preamble portion and the burst portion. On the other hand, when the difference of depths of recesses is 20 nm, excessive side etching occurs in the preamble portion, on the contrary to the case using the stamper with no difference in depth. For this reason, the difference of broadenings of patterns spreads approximately 4 nm.

If the difference of depths of recesses of patterns between different pattern areas is 5 nm to 15 nm, it is possible to control the variability of broadenings of patterns to around 2 nm or less. Consequently, it is possible to reduce difficulties of stamper design. Accordingly, it is preferable that the difference of depths of recesses of patterns between different pattern areas is 5 nm to 15 nm.

Next, a method of manufacturing a stamper for a magnetic recording media according to the present invention will be explained hereinafter with reference to the drawings.

The above-described stamper according to the invention is manufactured by the imprint method by use of a normal stamper having equal depths of recesses. In order to manufacture a stamper having different depths of recesses by use of a smatter having equal depths of recesses, it is necessary to adjust the imprint pressure.

In order to find out imprint pressure preferable for manufacturing the stamper of the invention, a stamper was manufactured while changing raw materials of resist and imprint pressures, and the depths of recesses were evaluated. As the resist, Photo Resist (manufactured by Rohm & Haas Co., S1801), organic SOG (manufactured by Tokyo Ohka Kogyo Co., Ltd., OCD-T7-5500T, 8000T, 12000T), and inorganic SOG (manufactured by Tokyo Ohka Kogyo Co., Ltd., OCD-T2) were used. The imprint pressure was changed to 50, 100, 150 and 200 MPa. Table 2 shows the difference of the depths of recesses between the recording track portion and the address portion, in the case where the resist raw materials and the imprint pressures were changed, respectively. The depths of recesses in the recording track portion and the address portion were observed by AFM. Herein, the values in Table 2 are the values of depths of recesses of patterns, and imprint residues are not included. Further, the above depth are the values of depths of recesses when a 1.8-inch disk is imprinted, and the disk size and pressure are not specifically limited.

TABLE 2

|  | S1801 | SOG (5500T) | SOG (8000T) | SOG (12000T) | T2 |
| --- | --- | --- | --- | --- | --- |
| 50 MPa | 3 nm | 5 nm | 3 nm | 3 nm | 1 nm |
| 100 MPa | 5 nm | 10 nm | 8 nm | 5 nm | 2 nm |
| 150 MPa | 3 nm | 5 nm | 3 nm | 3 nm | 2 nm |
| 200 MPa | 0 nm | 0 nm | 0 nm | 0 nm | 0 nm |

As is apparent from Table 2, sufficient depth differences could not be obtained in the case where the pressure was 50 MPa even with use of any raw material. In addition, at 150 and 200 MPa, the pressure saturated, and sufficient depth differences could not be attained either. On the other hand, in the case of 100 MPa almost half the saturation pressure, it has been confirmed that the difference of depths of recesses between the recording track portion and the address portion becomes largest. Accordingly, in order to manufacture a stamper having different depths of recesses, it is preferable to imprint it at the pressure around half the saturation pressure (pressure higher than 25% and lower than 75%).

On the basis of the above results, herein SOG (manufactured by Tokyo Ohka Kogyo Co., Ltd., OCD-Type 7-8000T) was used as the resist, and 100 Mpa, which is half the normal pressure, was used as the imprint pressure.

As a substrate 801, a glass substrate with a diameter of 2.5 inches was used. Herein, since the substrate size is changed according to the size of a stamper to be manufactured, it is not limited to 2.5 inches. Further, examples of the raw material of the substrate may include silicon, GaAs, and aluminum as well as glass, but not specifically limited thereto.

Figure 8A:
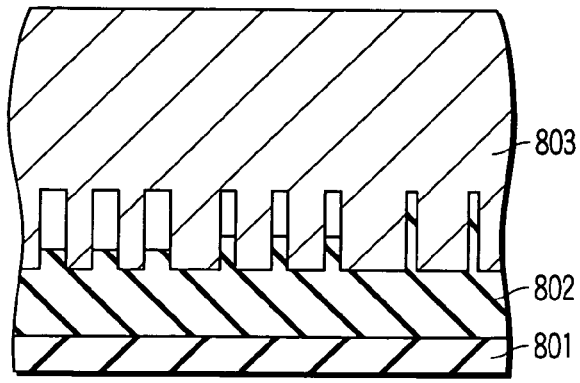
FIGS. 8A, 8B, 8C, 8D and 8E are views showing an example of a method of manufacturing a stamper for a magnetic recording media according to the invention.

On the substrate 801, SOG (manufactured by Tokyo Ohka Kogyo Co., Ltd., OCD-Type7-8000T) as a resist 802 is spin coated at 6000 rpm. Spin coat is generally used as the method of applying the resist 802. However, a dipping method, an ink jet method or scan type application may be employed. Further, as the resist, not only SOG but also aluminum alkoxide and photo resist or the like for use in semiconductor manufacture process may be employed. Thereafter, prebaking is performed at 100° C., and as shown in FIG. 8A, the resist is imprinted under the above-described conditions by use of a stamper 803 having equal depths of recesses.

Figure 8B:
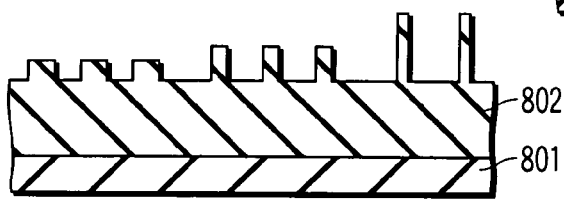
Figure 8C:
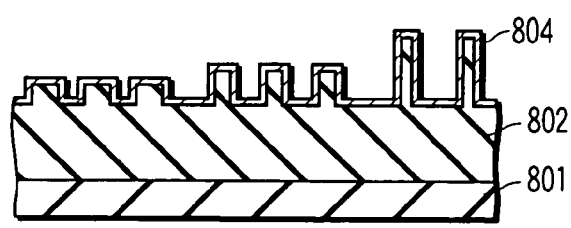

On the resist after imprint shown in FIG. 8B, a metal such as nickel is formed into a film of around 20 nm by use of a spattering method, as a conductive film 804 as shown in FIG. 8C. Herein, nickel was used as the conductive film 804. Pure nickel was used as a target. A chamber was vacuumed to $8 \times 10^{-3}$ Pa, and then, argon gas was introduced into the chamber to adjust the pressure to 1 Pa. In the chamber, DC power of 400 W was applied to carry out spattering for 40 seconds, and a conductive film of 30 nm was obtained.

Figure 8D:
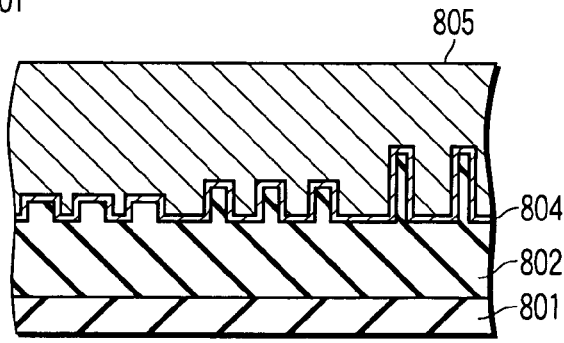

Thereafter, as shown in FIG. 8D, a plating process is carried out with the conductive film 804 as an electrode to thereby form an electroforming film 805 having a thickness of around 200 μm. Examples of a nickel plating bath for use in nickel electroforming include a Watts bath with addition of a specific organic additive, a normal nickel sulfamate bath, and a rich nickel sulfamate bath (high speed bath), but not limited thereto. Herein, by use of a nickel sulfamate plating liquid (manufactured by Showa Chemical Industry Co., Ltd., NS-160), electroforming was carried out for 90 minutes. The electroforming conditions are as follows.

Nickel sulfamate: 600 g/L, boric acid: 40 g/L, surfactant (sodium lauryl sulfate): 0.15 g/L, liquid temperature: 55° C., pH: 4.0, current density: 20 A/dm$^2$.

The thickness of the formed electroforming film 805 was 300 μm.

Then, the substrate is removed to obtain a stamper having the conductive film 804, the electroforming film 805 and resist residues for imprint.

Figure 8E:
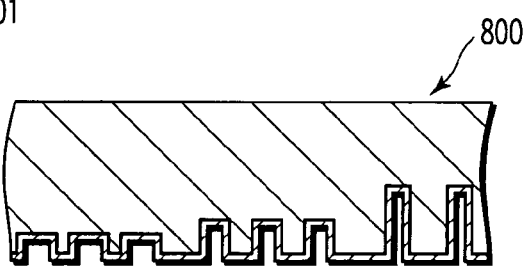

Thereafter, the resist residues are removed by RIE. For example, RIE is carried out in an ICP etching apparatus by use of CF$_4$ gas with an etching pressure of around 5 mTorr, whereby residues are removed. After the removal of resist residues, the stamper of the invention, having the conductive film 804 and the electroforming film 805, as shown in FIG. 8E can be obtained.

As described above, by use of the stamper of the invention, it is possible to uniform broadenings of patterns after completion of a media from stamper patterns as design values irrespective of pattern areas, and to manufacture a DTR type magnetic recording media by the high pressure imprint method advantageous in the viewpoint of throughput.

Moreover, by use of a method of manufacturing a stamper for a magnetic recording media according to the invention, it is possible to manufacture a stamper in which depths of recesses are different depending on pattern areas, the stamper being difficult to be manufactured by laser beam and ion beam etching, in such a manner that a master disk is manufactured by imprinting a normal stamper having equal depths of recesses in a simple manner with preferable mass productivity.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A stamper for a magnetic recording media, comprising:
    patterns of protrusions and recesses to manufacture a discrete track recording type magnetic recording media comprising servo areas including an address portion, a preamble portion and a burst portion, and data areas including a recording track portion, the patterns of protrusions and recesses being formed at a pitch of 400 nm or less,
    wherein a magnitude relation of depths of recesses corresponding to the address portion, the preamble portion, the burst portion and the recording track portion is inverted to a magnitude relation of area ratios of the recesses to the protrusions in the address portion, the preamble portion, the burst portion and the recording track portion.

2. The stamper for a magnetic recording media according to claim 1, wherein the servo areas includes an address portion, a preamble portion and an ABCD burst portion, and the depth of recesses corresponding to the address portion and the preamble portion is 5 to 15 nm larger than that of recesses corresponding to the recording track portion, and the depth of recesses corresponding to the recording track portion is 5 to 15 nm larger than that of recesses corresponding to the ABCD burst portion.

3. The stamper for a magnetic recording media according to claim 1, wherein the servo areas includes an address portion, a preamble portion, and a phase difference burst portion, and the depth of recesses corresponding to the address portion, the preamble portion and the phase difference burst portion is 5 to 15 nm larger than that of recesses corresponding to the recording track portion.

* * * * *